Patented May 19, 1925.

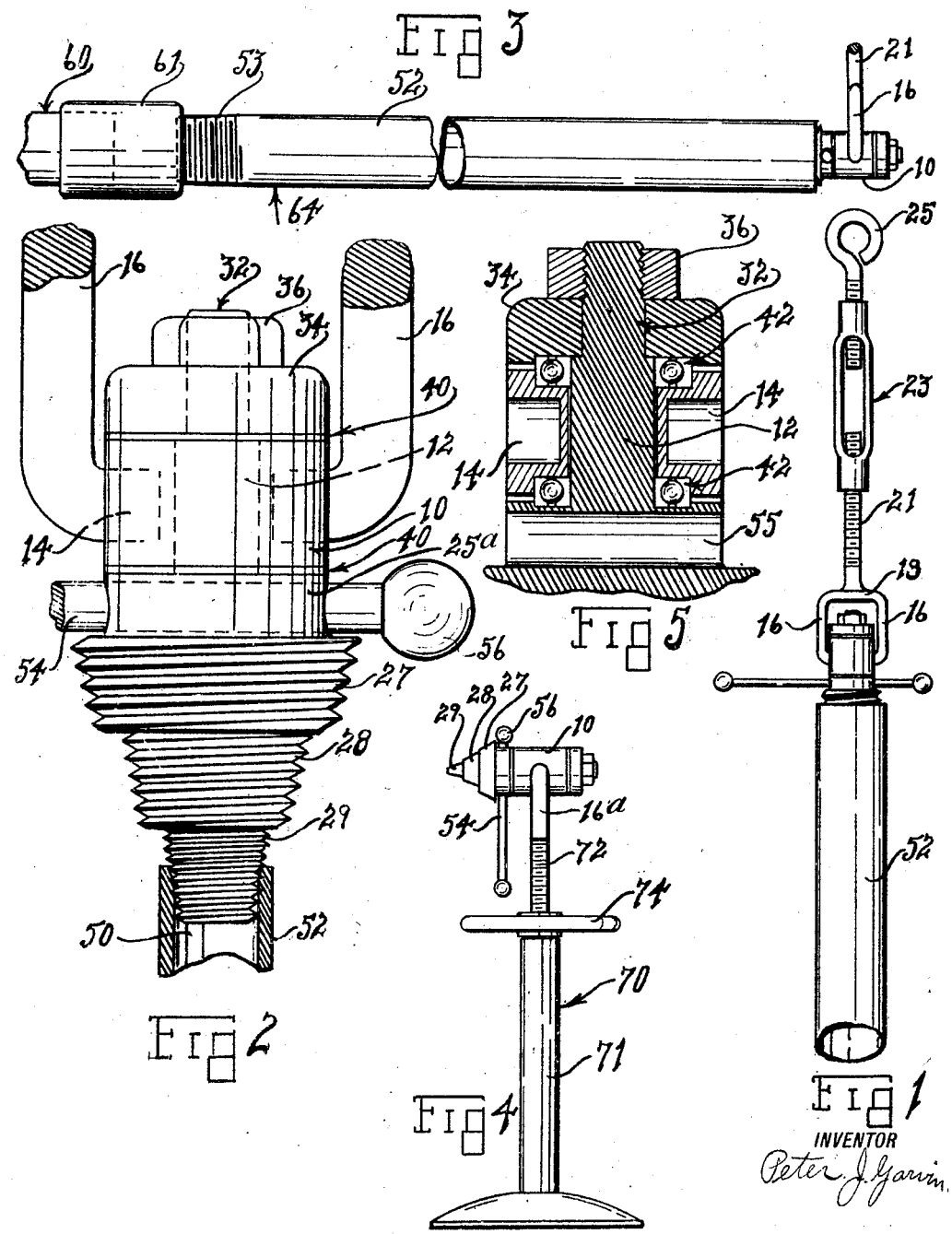

1,538,867

UNITED STATES PATENT OFFICE.

PETER J. GARVIN, OF NEW YORK, N. Y.

PIPE-SUPPORTING MEANS AND MORE ESPECIALLY TO PIPE LIFTERS.

Application filed September 17, 1923. Serial No. 663,286.

*To all whom it may concern:*

Be it known that I, PETER J. GARVIN, a citizen of the United States, and resident of New York city, in the county of New York and State of New York, have invented certain new and useful Improvements in Pipe-Supporting Means and More Especially to Pipe Lifters, of which the following is a specification.

This invention relates to improvements in pipe supporting means and more especially to pipe lifters.

It is the object of this invention to provide means whereby the handling of pipes and conduits, such as are commonly employed to convey fluids, will be facilitated and rendered less laborious.

It is the especial purpose of the invention disclosed herein to render it possible for a lesser number of mechanics to handle larger sizes and weights of such pipes with greater speed and ease.

In the erection of piping great difficulty is often experienced in supporting the pipe sections, which range from ten to twenty feet in length, in line so that their joints may be successfully engaged and "made up." This has been especially true where the piping is being hung to ceiling or wall far above the floor level and all work must be done from ladders or narrow insecure staging.

Often in shipment, pipe, which is commonly supplied threaded at each end, becomes so damaged that it is extremely difficult to engage another thread even at floor level, and when these pipes must be supported at arm's length, hours are sometimes spent in merely getting the thread "started."

The larger sizes of pipe, that is to say, those of two inches or over, are very difficult to cut by hand, and threading is customarily done at the shop to the measured lengths. In erecting these larger sizes men are required to support both ends of the pipe section and while rope slings may sometimes be employed such slings cling to the pipe surface and prevent the easy turning which so greatly facilitates engaging the threads and "making up" the joint.

The invention hereinafter described removes the necessity of men at both ends of the pipe section, thus cutting the number of men required in halves, it leaves the exterior of the piping free for manipulation and allows of free turning in either direction, it provides for correctly alining and centering the pipe sections whether they be horizontal, vertical or at an angle, and for engaging the threads even though the threads themselves be not truly cut about the pipe axis. It is inexpensive, of little bulk, easily adaptable to various pipe sizes and situations while providing many other improvements and advantages evident from the following description and the drawings attached thereto; in which:

Fig. 1 is an elevation of one embodiment of my invention in use.

Fig. 2 is an enlarged elevation of a portion of the device shown in Fig. 1.

Fig. 3 also taken in elevation, shows the embodiment depicted in Fig. 1 as used in making up a standard form of pipe joint.

Fig. 4 illustrates my invention as employed with a floor standard.

Fig. 5 serves to show in sectional view a modified form of internal construction of the device shown in Fig. 2.

Referring first to Figs. 1 and 2, a body 10 is provided with a longitudinal bore for journaling an arbor 12 (see dotted lines Fig. 2) and with sockets 14 for the reception of supporting members 16 which are joined by cross member 18 to which is attached the lower end of the rod 21 of the turnbuckle adjusting means 23.

Arbor 12 is provided at its lower end with an enlarged portion $25^a$ which terminates in the threaded engaging means 27, 28 and 29 which form ready means for engaging the interior of the pipe to be handled, as will be described.

The upper end of arbor 12 is provided with a reduced threaded portion 32. Upon the shoulder formed by the reduction in size just mentioned, a collar 34 is seated and secured firmly to the arbor by such means as the nut 36. Thus the arbor 12 is free to revolve in the body 10 while prevented from end movement therefrom by the portion $25^a$ and the collar 34. To reduce friction, bearing washers 40 may be inserted as shown, or where extra loads, such as extra heavy pipe are to be supported, ball bearings 42 may be used as shown in Fig. 5.

In operation the ring 25 of the turnbuckle 23 is attached to a suitable support, or where the lift is a considerable one, to the lower end of a rope or chain hoist. The pipe to be lifted is rolled or dragged beneath the device and a threaded step 27, 28 or 29, as the pipe size may require, is entered into the pipe bore 50 as shown in Fig. 2. The sockets 14 will be seen to provide bearings for the members 16 in such manner that whether the pipe be horizontal or at any angle thereto, the body 10 may be swung to enter the engaging portions in the pipe bore.

The thread upon these engaging portions (27, 28 and 29) is preferably made of very considerable taper and so hardened that upon revolving the arbor 12 in the proper direction the thread engages the rim 52 of the pipe bore 50 and cutting into the pipe forms a threaded connection therewith which because of its wedgelike nature forms a very secure grip upon the pipe 52. To assist in revolving arbor 12, and to supply a convenient leverage for screwing the threaded portions into the pipe bore, a handle 54 sliding in a transverse opening 55 in the arbor portion 25ª is provided. This handle may be removable, or provided with such means as the balls 56 to prevent its dropping from place (see Fig. 4).

After the pipe has been engaged, the hoisting means may be operated and the pipe (52) lifted to a vertical position as shown in Fig. 1, and to such height as may be desired for engagement with the pipe or fittings already in place. As an example of such piping which it is desired to engage, a pipe 60 has been shown as provided with a coupling 61 into which it is desired to screw the thread 53 of the pipe 52 (see Fig. 3). The pipe is hoisted until body 10 is approximately in line with the coupling 61 and the hoisting tackle made fast. Pipe 52 is then grasped adjacent thread 53, as at 64, and its end swung upward until it is opposite the end of coupling 61 and the turnbuckle 23 adjusted until in correct alinement; the thread 53 is then entered into coupling 61, arbor 12 journaling in body 10 permits pipe 52 to be revolved as desired, to engage the threads. Proper clamps or brackets may then be placed and, by means of handle 54, the lifter released for lifting a further section of pipe.

Manifestly in low lifts the turnbuckle 23 may be used alone, and it will also be evident that the turnbuckle 23 is but one form of convenient adjusting means which may be replaced by other lifting means as those skilled in the art will understand.

The floor stand 70, shown in Fig. 4, is an example of such a lifting means, the standard 71 being provided with an internal bore in which slides a threaded rod 72 upon which threads a wheel nut 74. This wheel nut 74 bears upon the upper end of standard 71 and upon turning it rod 72 is raised or lowered. Suitable members 16ª upon the upper extremity of rod 72 support the body 10 which has already been described. This floor stand provides a readily portable means for handling piping at moderate heights, such as the ordinary ceiling height, without requiring support from above.

It will be understood that while screwed joint conduits are shown my invention is equally applicable to flanged bell and spigot and many other forms of joint well known to the piping art.

Thus it will be seen that simple effective means for supporting the free end of pipes has been provided in such manner that a considerable portion of the human labor has been dispensed with and men of lesser strength are enabled to handle heavier objects at a lesser expenditure of time.

Evidently many changes and modifications in construction of the complete device and in the parts thereof may be made without departing from the spirit of my invention or the scope of the appended claim:

I claim:

Means for lifting and alining fluid conduits comprising hoisting means provided with fine adjustment for purposes of alinement and bifurcated to pivotedly engage a body, said body provided with socket means receiving the extremities of said bifurcated means and provided with a longitudinal bore journalling a rotatable arbor, said rotatable arbor provided with a bearing section engaging said bore, an enlarged portion engaging the end of said body, a reduced portion receiving a thrust collar engaging the other end of said body and a series of threaded portions adapted to engage the interior of the conduit and to cut into the walls thereof for securing the conduit thereto that the same may be lifted and by means of said pivoted, lifting and journalled means correctly alined and secured.

PETER J. GARVIN.